(12) United States Patent
Kruegel et al.

(10) Patent No.: US 11,139,989 B2
(45) Date of Patent: Oct. 5, 2021

(54) METHOD OF ENROLLING A DEVICE INTO A PKI DOMAIN FOR CERTIFICATE MANAGEMENT USING FACTORY KEY PROVISIONING

(71) Applicant: MOTOROLA SOLUTIONS, INC., Chicago, IL (US)

(72) Inventors: Chris A Kruegel, Plainfield, IL (US); Steven K Turner, Cary, IL (US); Mark Shahaf, Vernon Hills, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 104 days.

(21) Appl. No.: 16/556,594

(22) Filed: Aug. 30, 2019

(65) Prior Publication Data

US 2021/0067349 A1 Mar. 4, 2021

(51) Int. Cl.
*H04L 9/32* (2006.01)
*H04L 9/30* (2006.01)

(52) U.S. Cl.
CPC .......... *H04L 9/3268* (2013.01); *H04L 9/3073* (2013.01)

(58) Field of Classification Search
None
See application file for complete search history.

(56) References Cited

U.S. PATENT DOCUMENTS

| 9,143,886 | B1 | 9/2015 | Abou-El-Ella et al. |
| 9,712,492 | B1 | 7/2017 | Kim et al. |
| 10,083,440 | B2 | 9/2018 | Vidu et al. |
| 10,425,401 | B1* | 9/2019 | Pecen .................... H04L 9/0852 |
| 2004/0005904 | A1 | 1/2004 | Wolf et al. |
| 2004/0139329 | A1* | 7/2004 | Abdallah .............. H04L 9/0894 713/182 |
| 2008/0184030 | A1* | 7/2008 | Kelly .................... H04L 9/3268 713/156 |
| 2011/0161659 | A1* | 6/2011 | Himawan ............... H04L 9/006 713/156 |
| 2012/0066499 | A1* | 3/2012 | Ali ........................ G06F 21/31 713/170 |
| 2012/0216042 | A1 | 8/2012 | Brown et al. |
| 2013/0102286 | A1 | 4/2013 | Toksvig et al. |
| 2013/0140361 | A1 | 6/2013 | Ling |
| 2014/0279324 | A1 | 9/2014 | King et al. |
| 2015/0113267 | A1 | 4/2015 | Busser |
| 2015/0304309 | A1 | 10/2015 | Verma |

(Continued)

FOREIGN PATENT DOCUMENTS

EP 2940961 A1 11/2015

*Primary Examiner* — Michael Pyzocha

(57) ABSTRACT

A method, mobile device, and PKI are provided for enrolling a mobile device into a PKI domain for certificate management is provided. A first asymmetric key pair and a unique identifier is established in a device. The first asymmetric key pair includes a public key and a private key. The public key and the unique identifier are transferred to the PKI domain. The public key and the unique identifier are imported into the PKI domain. The device generates a second asymmetric kay pair and sends a certificate signing request (CSR) that is protected with the digital signature of the first asymmetric key pair. The CSR is transferred to the PKI domain. The PKI domain authenticates the CSR using the first public key and the unique identifier. Upon validation, the PKI domain issues a certificate to the device.

14 Claims, 4 Drawing Sheets

(56) References Cited

U.S. PATENT DOCUMENTS

| | | | |
|---|---|---|---|
| 2015/0326543 A1* | 11/2015 | Pochuev | G06F 21/57 |
| | | | 713/155 |
| 2015/0379308 A1 | 12/2015 | Nakano et al. | |
| 2016/0094548 A1* | 3/2016 | Lee | H04L 63/0861 |
| | | | 713/186 |
| 2016/0134624 A1 | 5/2016 | Jacobson et al. | |
| 2017/0093565 A1* | 3/2017 | Yang | H04W 12/0433 |
| 2018/0007037 A1 | 1/2018 | Reese | |
| 2018/0060904 A1 | 3/2018 | Hunt et al. | |
| 2018/0206117 A1 | 7/2018 | Stahl | |
| 2018/0316511 A1 | 11/2018 | Meyer et al. | |
| 2018/0323977 A1* | 11/2018 | Hojsik | H04L 63/061 |
| 2019/0074980 A1 | 3/2019 | Loreskar | |
| 2019/0149316 A1* | 5/2019 | Pala | H04L 67/34 |
| | | | 713/156 |

* cited by examiner

METHOD OF ENROLLING A DEVICE INTO A PKI DOMAIN FOR CERTIFICATE MANAGEMENT USING FACTORY KEY PROVISIONING

BACKGROUND OF THE INVENTION

Fraudulent and cloned devices cause security issues and lost revenue. A vital security need in communication systems is to identify, authenticate, and authorize legitimate devices to access services. One way to handle authentication and authorization for devices is to use cryptographic keys.

Cryptographic keys are used to provide for secure encryption and decryption of information as well as device identification, authentication, and authorization. Unfortunately, the management of keys is complex, and symmetric cryptography provides protection challenges.

Therefore a need exists for a method and system for providing cryptographic protection for devices and provided services while decreasing the complexity of key management.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
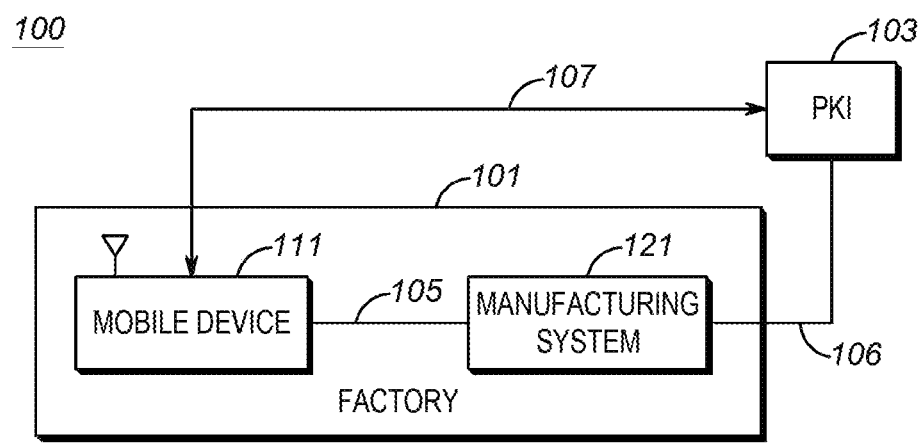
FIG. 1 depicts a system diagram of a system for enrolling a device into a PKI domain for certificate management in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment provides using a device generated asymmetric key pair to authenticate enrollment into a public key infrastructure (PKI) domain. The PKI domain comprises the end-to-end solution using a PKI ad includes all elements managed by the PKI and all elements that have certificates issued by the PKI. The generation of the device asymmetric key pair and unique device identifier (ID) preferably occurs during factory provisioning and configuration of the device, which in an exemplary embodiment is a mobile device. It should be understood that an exemplary embodiment relates to the factory provisioning and configuration of a device, but can alternately be performed on a circuit board that is later utilized within a device. The delivery of the public key of the generated device asymmetric key pair and unique device ID to the PKI preferably occurs prior to device enrollment, and preferably occurs over a different interface to the PKI than the interface over which device enrollment occurs. The device asymmetric key pair and unique device ID are preferably immutable on the device or circuit board and may be used more than once, based on policy, to enroll the device or circuit board into or with the PKI as needed. The device asymmetric key pair and unique device ID are unique to the device or circuit board, thus enabling the PKI to authenticate a device during enrollment.

The device will use the private key of the device asymmetric key pair to digitally sign a Certificate Signing Request (CSR), which preferably comprises a unique device ID. The device will send the CSR to the PKI as part of the enrollment process with the PKI domain. The PKI will use the delivered device public key and preferably the delivered unique device ID to authenticate the CSR received from the device. Based on a successful authentication result and other CSR verification, the PKI will issue a certificate to the device, enrolling the device into the PKI domain.

This exemplary embodiment thereby creates a service certificate that includes identifying information such as a device unique ID. In this manner, only device asymmetric key pairs with the device public key provisioned into the PKI can be used to authenticate device enrollment. Other devices will preferably be rejected and flagged when attempting to enroll into the PKI.

FIG. 1 depicts a system diagram of a system 100 for enrolling a device into a PKI domain for certificate management in accordance with an exemplary embodiment of the present invention. System 100 preferably includes a Factory 101 and a PKI 103.

Factory 101 preferably includes mobile device 111 and Manufacturing System 121. Factory 101 is preferably where mobile devices will be provisioned and configured, including generating the device asymmetric key pair and unique device ID. Preferably, the Manufacturing System 121 will obtain the public key portion of the generated device asymmetric key pair and unique device ID from the mobile device 111 and deliver them to PKI 103. In an exemplary embodiment, the factory is a manufacturer-controlled environment where the platform asymmetric key pair is generated on the device and permanently stored, along with the unique device identifier. The Factory Test Station extracts the platform asymmetric public key and device identifier from the device for storage in the manufacturing database.

In accordance with an exemplary embodiment, the device asymmetric key pair, once generated, is protected against erasure, since these keys are the method to authenticate the mobile device to PKI 103. Further, the device asymmetric key pair enables production of properly signed certificates for various services. Without this key pair, Mobile Device 111 will not be able to authenticate itself to PKI 103 as a genuine device.

Mobile device 111 preferably protects the private portion of the asymmetric key material against information disclosure. This confidentiality protection preferably applies to device and service private keys. Modern processors typically provide hardware capabilities to securely encrypt and store key material. The encryption of key material preferably utilizes designated encryption keys that are unique to the device; thus even if the encrypted key material can be recovered from a device, it cannot be decrypted on another device.

Mobile device 111 is sometimes referred to as a subscriber unit. It should be understood that system 100 would typically include a plurality of mobile devices, but only one, mobile device 111, is depicted in FIG. 1 for clarity. Mobile device 111 includes any end point that needs certificates.

Manufacturing System 121 collects various data from mobile devices, such as by receiving the device public key of the generated device asymmetric key pair. Manufacturing System 121 receives a mobile device 111's public key, $PK_D$, or alternately associated self-signed certificate that contains $PK_D$, along with a unique device ID of Mobile Device 111. The device public key and preferably the unique device ID will then be delivered to PKI 103. The unique device identifier of mobile device 111 is preferably an identifier such as a processor electronic serial number, memory component electronic serial number, random generated number or combination of the above.

Manufacturing System 121 stores characteristics, identifiers and other information about the mobile devices as they are manufactured.

Figure 2:
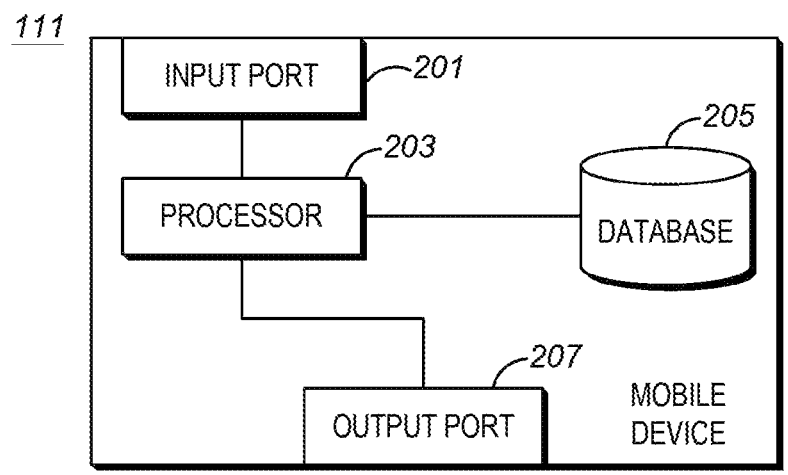
FIG. 2 depicts a mobile device in accordance with an exemplary embodiment of the present invention.

FIG. 2 schematically illustrates mobile device 111 in more detail. In the exemplary embodiment depicted in FIG. 2, mobile device 111 includes an input port 201, a processor 203, a database 205, and an output port 207. Input port 201 and processor 203 communicate over one or more communication lines or buses, as do processor 203 and output port 207. Wireless connections or a combination of wired and wireless connections are also possible.

Input port 201 receives electronic signals from PKI 103 and Manufacturing System 121. Input port 201 is electrically connected to processor 203. Output port 207 transmits signals to PKI 103 and Manufacturing System 121. Output port 207 is electrically coupled to processor 203. Although depicted in FIG. 2 as two separate elements, input port 201 and output port 207 can be a single element, such as a transceiver that could be an LTE modem, an FM transceiver, or a Wi-Fi or Ethernet transceiver.

Processor 203 may include a microprocessor, application-specific integrated circuit (ASIC), field-programmable gate array, or another suitable electronic device. Processor 203 obtains and provides information (for example, from database 205 and/or input port 201), and processes the information by executing one or more software instructions or modules, capable of being stored, for example, in a random access memory ("RAM") area of database 205 or a read only memory ("ROM") of database 205 or another non-transitory computer readable medium (not shown). The software can include firmware, one or more applications, program data, filters, rules, one or more program modules, and other executable instructions. Processor 203 is configured to retrieve from database 205 and execute, among other things, software related to the control processes and methods described herein.

Database 205 can include one or more non-transitory computer-readable media, and may include a program storage area and a data storage area. The program storage area and the data storage area can include combinations of different types of memory, as described herein. In the embodiment illustrated, database 205 stores, among other things, instructions for processor 203 to carry out the any methods included herein.

Figure 3:
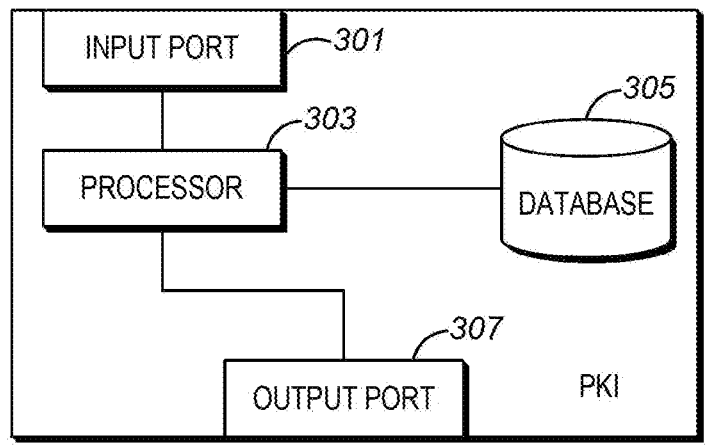
FIG. 3 depicts a PKI in accordance with an exemplary embodiment of the present invention.

FIG. 3 schematically illustrates PKI 103 in more detail. In the exemplary embodiment depicted in FIG. 3, PKI 103 includes an input port 301, a processor 303, a database 305, and an output port 307. Input port 301 and processor 303 communicate over one or more communication lines or buses, as do processor 303 and output port 307. Wireless connections or a combination of wired and wireless connections are also possible.

Input port 301 receives electronic signals from Factory 101. More particularly, input port 301 receives electronic signals from mobile device 111 and Manufacturing System 121. Input port 301 is electrically connected to processor 303. Output port 307 transmits signals to Factory 101, and more particularly mobile device 111 and Manufacturing System 121. Output port 307 is electrically coupled to processor 303. Although depicted in FIG. 3 as two separate elements, input port 301 and output port 307 can be a single element, such as a transceiver that could be an LTE modem, an FM transceiver, or a Wi-Fi or Ethernet transceiver.

Processor 303 may include a microprocessor, application-specific integrated circuit (ASIC), field-programmable gate array, or another suitable electronic device. Processor 303 obtains and provides information (for example, from database 305 and/or input port 301), and processes the information by executing one or more software instructions or modules, capable of being stored, for example, in a random access memory ("RAM") area of database 305 or a read only memory ("ROM") of database 305 or another non-transitory computer readable medium (not shown). The software can include firmware, one or more applications, program data, filters, rules, one or more program modules, and other executable instructions. Processor 303 is configured to retrieve from database 305 and execute, among other things, software related to the control processes and methods described herein.

Database 305 can include one or more non-transitory computer-readable media, and may include a program storage area and a data storage area. The program storage area and the data storage area can include combinations of different types of memory, as described herein. In the embodiment illustrated, database 305 stores, among other things, instructions for processor 303 to carry out the any methods included herein.

Figure 4:
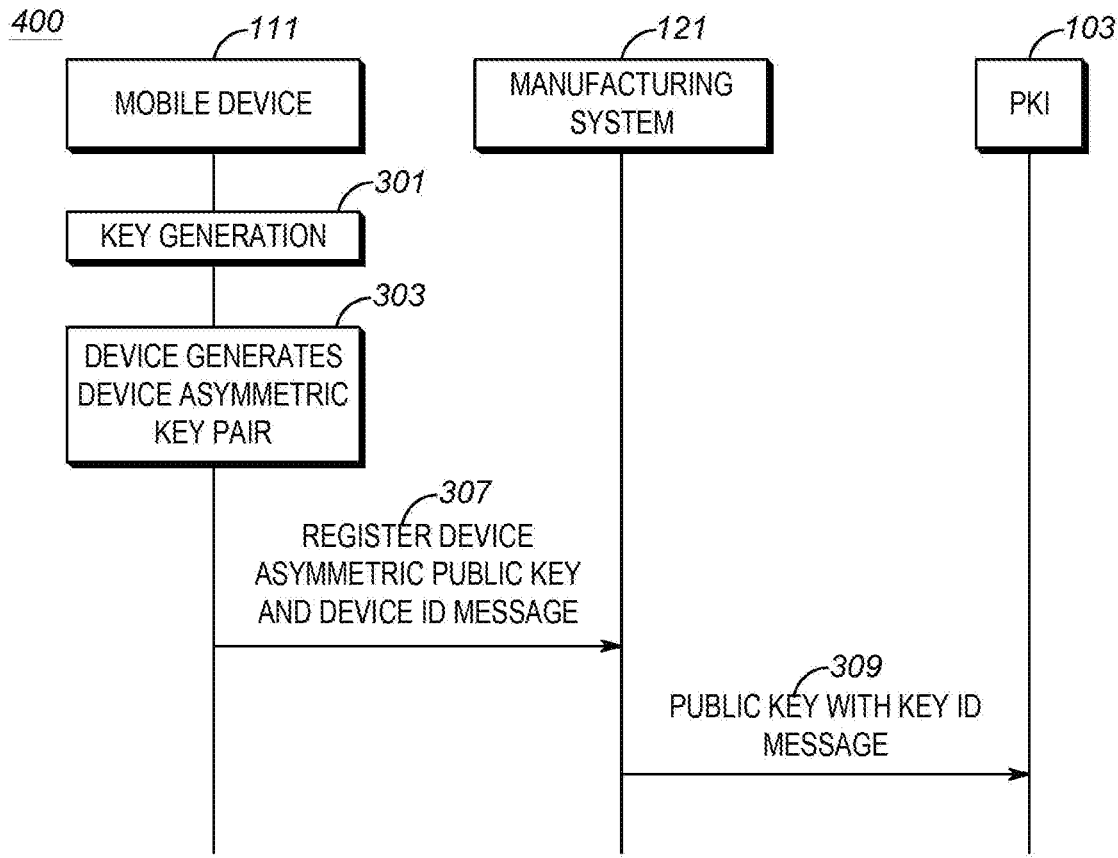
FIG. 4 depicts a flow diagram in accordance with an exemplary embodiment of the present invention.

FIG. 4 depicts a flow diagram 400 in accordance with an exemplary embodiment of the present invention. Manufacturing System 121 preferably sends Create Device Asymmetric Public Key Message 405 to Mobile Device 111. In accordance with an exemplary embodiment, Mobile Device 111 generates (403) a device asymmetric key pair comprising public key, $PK_D$, and private key, $SK_D$.

The private key $SK_D$, is preferably securely stored in mobile device 111 and protected against erasure. Public key $PK_D$ does not need protection against disclosure, since it is a public key. However, the public key does require protection against erasure in the device. In accordance with an exemplary embodiment, all asymmetric keys are generated within a device and the private key is never exposed outside the device. The generated device asymmetric key pair is preferably unique for each manufactured device. The device asymmetric key pair remains intact for the lifetime of the device.

In accordance with an exemplary embodiment, after generating the device asymmetric key pair, Mobile Device 111 sends Register Device Asymmetric Public Key and Device ID Message 407 to Manufacturing System 121. In the preferred embodiment this message includes $PK_D$ and the unique device ID.

Manufacturing System 121 then sends Public Key with Key ID Message 409 to PKI 103. In the preferred embodiment this message includes $PK_D$ and the unique device ID of Mobile Device 111. PKI 103 will receive this message and store the Mobile Device 111 $PK_D$ and unique device ID. PKI 103 will use this information to authenticate an enrollment request from Mobile Device 111. In accordance with an exemplary embodiment, the Public Key and unique device ID are protected cryptographically during transport.

Figure 5:
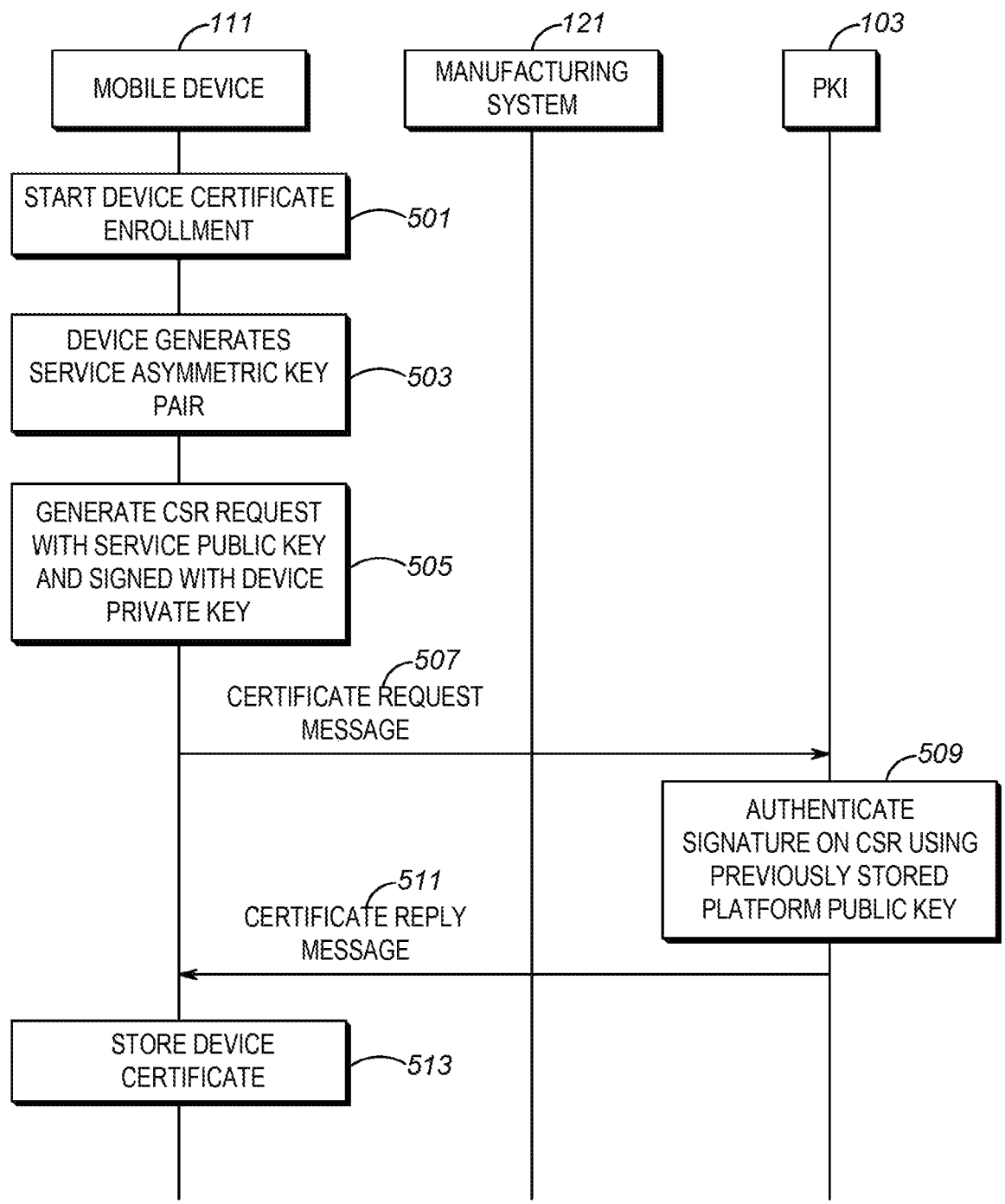
FIG. 5 depicts a flow diagram in accordance with an exemplary embodiment of the present invention.

FIG. 5 depicts a flow diagram 500 in accordance with an exemplary embodiment of the present invention. In accordance with an exemplary embodiment, Mobile Device 111 starts (501) device certificate enrollment. Mobile Device 111 generates (503) a service asymmetric key pair comprising public key, $PK_S$, and private key, $SK_S$. Mobile Device 111 generates (505) a CSR with $PK_S$ and preferably the device unique ID and cryptographically signs the message carrying the CSR using device key SKID.

After creating the service CSR, compiling a Certificate Request Message, and signing the message with the device private key $SK_F$, Mobile Device 111 sends Certificate Request Message 507 to PKI 103. PKI 103 receives this message and uses $PK_D$ and preferably the unique device ID to authenticate (509) the CSR received from Mobile Device 111. Based on a successful authentication result and preferably other CSR verification, PKI 103 issues a service certificate for the Mobile Device 111, enrolling Mobile Device 111 into the PKI domain, and sends Certificate Reply Message 511 to Mobile Device 111. Mobile Device 111 will store (513) the service certificate.

Figure 6:
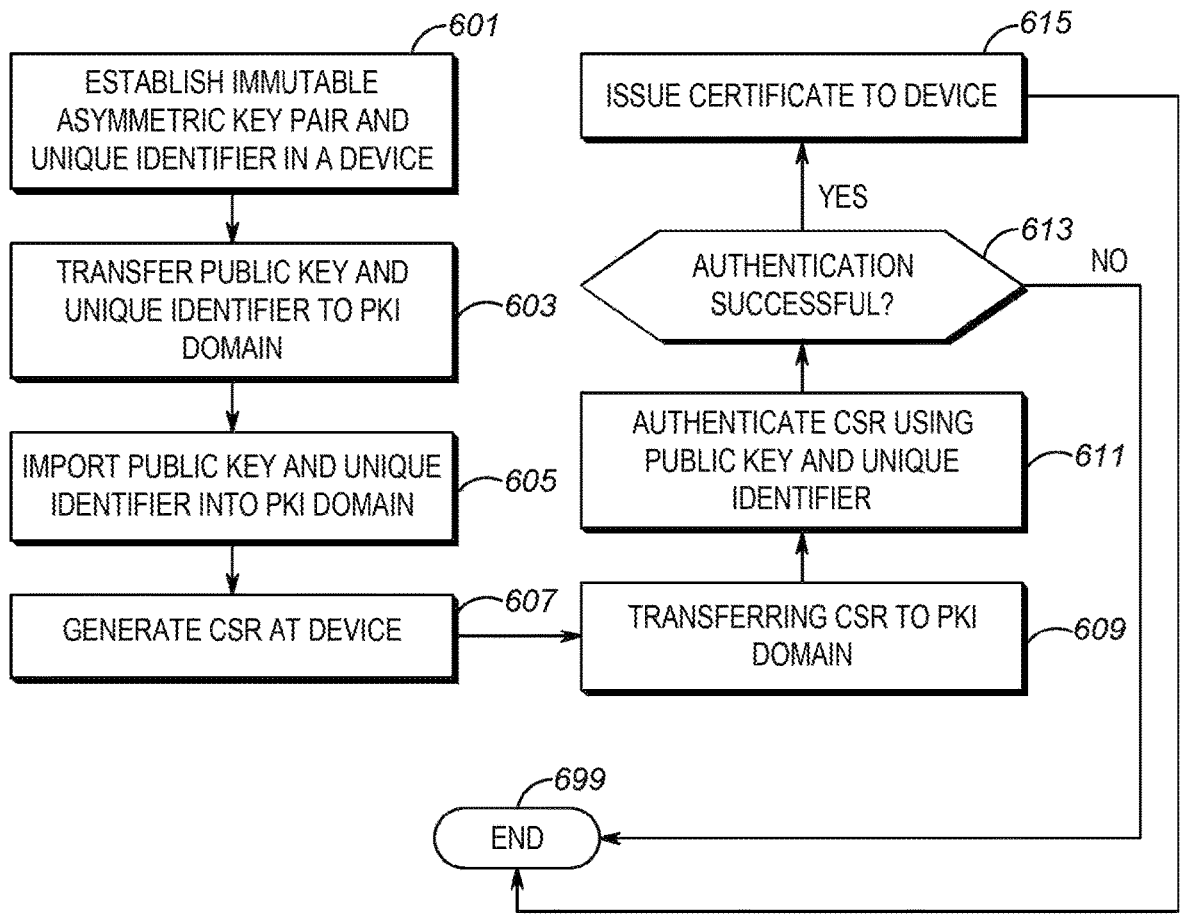
FIG. 6 depicts a flowchart in accordance with an exemplary embodiment of the present invention.

FIG. 6 depicts a flowchart 600 of a method of enrolling a device into a PKI domain for certificate management in accordance with an exemplary embodiment.

Factory 101 establishes (601) a device asymmetric key pair and a unique identifier in Mobile Device 111. In accordance with an exemplary embodiment, the device asymmetric key pair comprises a public key and a private key.

Factory 101 transfers (603) the public key and the unique identifier to PKI 103.

PKI 103 imports (605) the public key and the unique identifier.

Mobile device 111 generates (607) a certificate signing request (CSR). In accordance with an exemplary embodiment, the CSR is protected with the digital signature of the device private key.

The CSR is transferred (609) to PKI 103.

PKI 103 authenticates (611) the CSR, preferably using the device public key and the unique identifier.

PKI 103 determines (613) if the authentication of the CSR was successful. If the authentication was not successful, the process ends (699). If the authentication was successful, PKI 103 issues (615) a certificate to Mobile Device 111.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of establishing a trust relationship between a mobile device and a PKI domain for certificate management comprising:
   receiving, by a mobile device, during a factory provisioning and configuration of the mobile device, a request from a manufacturing system to generate an asymmetric key pair at the mobile device and responsively establishing a first asymmetric key pair in the mobile device and permanently storing the first asymmetric key pair comprising a public key and a private key at the mobile device;
   setting a policy at the mobile device allowing the first asymmetric key pair to be used for enrolling the mobile device with the PKI domain for more than once;
   extracting the public key from the mobile device for storage in a manufacturing database included in the manufacturing system;
   transferring the public key from the manufacturing database to the PKI domain; and
   importing the public key into the PKI domain.

2. The method of claim 1, the method further comprising the step of establishing a unique identifier in the mobile device.

3. The method of claim 2, the method further comprising the step of transferring the unique identifier to the PKI domain.

4. The method of claim 3, the method further comprising the step of importing the unique identifier into the PKI domain.

5. The method of claim 1, the method further comprising the steps of
   generating a second asymmetric key pair at the mobile device;
   generating a Certificate Signing Request (CSR) corresponding to the second asymmetric key pair at the mobile device, the CSR message is cryptographically protected with the private key of the first asymmetric key pair;
   transferring the CSR message to the PKI domain;
   authenticating the CSR message; and
   upon authentication, issuing by the PKI domain a certificate to the mobile device.

6. The method of claim 5, the wherein the step of authenticating the CSR message comprises authenticating, by the PKI domain, the CSR message using the public key of the first asymmetric key pair.

7. The method of claim 6, the method further comprising authenticating, by the PKI domain, the CSR message using a unique identifier of the mobile device.

8. The method of claim 7, the method further comprising the step of upon authentication the CSR message using the unique identifier of the mobile device, issuing by the PKI domain a second certificate to the mobile device.

9. The method of claim 6, the method further comprising the step of issuing by the PKI domain the certificate to the mobile device.

10. A Public Key Infrastructure (PKI) domain for enrolling a mobile device into the PKI domain for certificate management, the PKI domain comprising:
    a processor that performs generating a first asymmetric key pair and a unique identifier in a mobile device, the first asymmetric key pair comprising a public key and a private key that are permanently stored at the mobile device, wherein the processor sets a policy at the mobile device allowing the first asymmetric key pair to be used for enrolling the mobile device with the PKI domain for more than once;
    an output port coupled to the processor that performs transferring the public key and the unique identifier to the PKI domain;
    an input port coupled to the processor that performs importing the public key and the unique identifier into the PKI domain;
    wherein the processor performs generating a certificate signing request (CSR) message at the mobile device, wherein the CSR message is cryptographically protected by the private key of the first asymmetric key pair; and
    wherein the output port performs transferring the CSR message to the PKI domain.

11. The PKI domain of claim 10, wherein the processor further performs:
    authenticating the CSR message using the public key of the first asymmetric key pair; and
    upon authentication, issuing by the PKI domain a certificate to the mobile device.

12. The PKI domain of claim 11, the method further comprising the step of authenticating the CSR message using the unique identifier.

13. A mobile device comprising:
    a processor that performs:
       receiving, during a factory provisioning and configuration of the mobile device, a request from a manufacturing system to generate an asymmetric key pair;
       generating a first asymmetric key pair comprising a public key and a private key and permanently storing the first asymmetric key pair;
       setting a policy allowing the first asymmetric key pair to be used for enrolling the mobile device with a PKI domain for more than once; and
       generating a corresponding CSR message, the corresponding CSR message cryptographically protected with the private key of the first asymmetric key pair; and
    an output port that performs transferring the corresponding CSR message to the PKI domain.

14. The mobile device of claim 13, wherein the processor further performs using the first asymmetric key pair to sign the corresponding CSR message.

* * * * *